Figure 1:
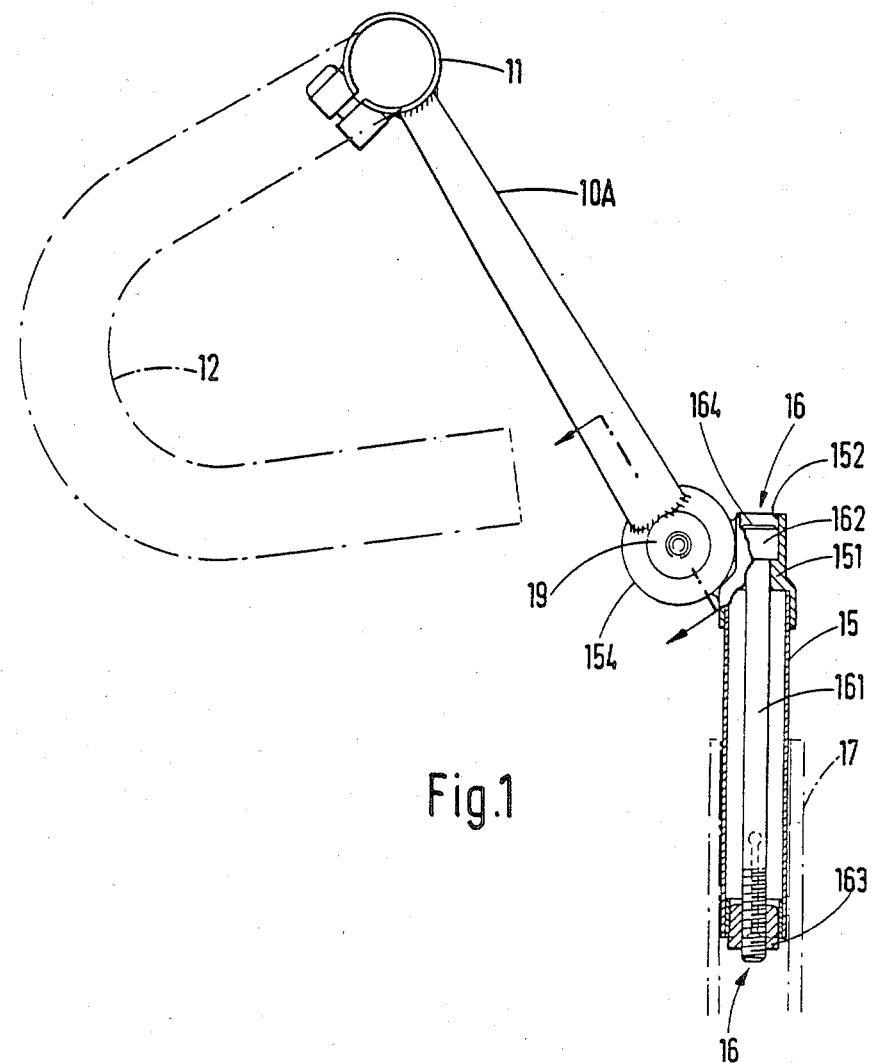

United States Patent [19]

Moulton

[11] Patent Number: 4,729,255

[45] Date of Patent: Mar. 8, 1988

[54] WISHBONE ADJUSTABLE HANDLE BAR STEM

[75] Inventor: Alexander E. Moulton, Bradford-on-Avon, England

[73] Assignee: Alex Moulton Limited, Bradford-on-Avon, England

[21] Appl. No.: 927,945

[22] Filed: Nov. 7, 1986

[30] Foreign Application Priority Data

Nov. 14, 1985 [GB] United Kingdom ............... 8528112

[51] Int. Cl.⁴ ............................................. B62K 21/16
[52] U.S. Cl. ................................... 74/551.3; 74/551.4
[58] Field of Search ................. 74/551.3, 551.4, 551.5, 74/551.1, 551.8

[56] References Cited

U.S. PATENT DOCUMENTS

| 606,192 | 6/1898 | Dayhoff | 74/551.4 |
| 624,643 | 5/1899 | Gaylor | 74/551.4 |
| 3,336,817 | 8/1967 | Madden, Jr. | 74/552 |
| 4,384,497 | 5/1983 | Gatsos | 74/551.4 |

FOREIGN PATENT DOCUMENTS

| 523314 | 10/1953 | Belgium | 74/551.3 |
| 92811 | 11/1983 | European Pat. Off. | 74/551.5 |
| 614303 | 12/1926 | France | 74/551.4 |
| 414867 | 8/1946 | Italy | 74/551.1 |
| 841442 | 7/1960 | United Kingdom | 74/551.3 |

Primary Examiner—Gary C. Smith
Assistant Examiner—Rodney M. Lindsey
Attorney, Agent, or Firm—Dennison, Meserole, Pollack & Scheiner

[57] ABSTRACT

In a handlebar assembly of the type comprising a tubular stem adapted to be adjustably mounted in known manner to a steering column mounted for rotation, also in known manner, in a head tube of a bicycle, and of the type wherein from the top of said stem, there branches a forward extension for mounting the handlebar; the improvement that the said forward extension comprises twin bi-furcated fork arms, each with an encircling clamp at its forward, distal, end to mount the handlebar, the arms, at their rear ends, each being pivotally secured by a rotationally adjustable serrated clamp device, to the top of the said tubular stem which is adjustably clamped in the steering column.

4 Claims, 4 Drawing Figures

WISHBONE ADJUSTABLE HANDLE BAR STEM

The present invention relates to a handlebar assembly for a bicycle, the handlebar assembly being particularly suitable for a bicycle whose wheels are considerably smaller, at 16 to 17 inches diameter, than those of a conventional bicycle with wheels of 26 to 28 inches diameter; and it is particularly suitable also for a bicycle having an open frame, that is one which lacks a crossbar located at a height which is just below the height of the saddle.

One conventional handlebar assembly comprises a stem upstanding from a steering column, the stem being surmounted by the handlebar itself. But in a common variation of this, a forward extension branches from the top of the stem and is provided at its distal or leading end with an encircling clamp for holding the handlebar. This enables the bar to be adjusted by rotation in the clamp. The lower part of the stem is clamped in the steering column so that it may be adjusted axially, to raise or lower the handlebar. In the conventional assembly just described the forward extension is composed of a single tubular element and this is fixed without provision for adjustment to the stem.

A viable alternative to these known assemblies is proposed according to the present invention, in that there is provided a handlebar assembly of the type comprising a steering column surmounted stem, from the top of which there branches a forward extension for mounting the handlebar, and the assembly is characterized in that the forward extension comprises twin bi-furcated fork arms, each having at its distal or leading end, an encircling clamp to mount the handlebar, the arms, at their rear ends, each being pivotally secured by a rotationally adjustable serrated clamp device, to the top of said tubular stem which is adjustably clamped in the steering column.

The present invention therefore comprises a handlebar assembly, with readily adjustable twin fork arms in place of the non-adjustable single tubular element extending forwardly from the stem, as in one conventional arrangement. The arms are tubular and they may be forged solid or hollow. They may be curved but preferably they are straight. In all cases the twin arms are bi-furcated in the sense that they diverge from one another towards their distal end and in the direction away from their adjustable pivotal connection with the stem.

These twin fork arms are secured by the serrated clamp device to the top of the stem and are adjustable pivotally about a generally transverse horizontal axis when the serrated clamp device is loosened. The stem, with the aid of a releasable expander-bolt clamping device engaging within the steering column, provides a range of up and down height adjustment for the handlebar. The pivoting of the twin arms relative to the stem allows adjustment of the handlebar through a wide range of forward and downward positions; the handlebar in turn, being rotatably clamped at the forward extremities of the twin fork arms.

These adjustments, at an extreme position, permit the handlebar assembly to be so turned that there is the minimum occupation of space for the complete machine when it is being stowed, whether separated into two halves or not.

The twin-armed bi-furcated construction, gives a span for the clamped attachment to the handlebar, which is stiffer than is achieved with the conventional stem with a single element forward extension; and this can be favourably felt under strong riding action with alternating pulls on each end of the handlebar. The top span is so arranged that there is a new and pleasing position for the rider's hands with fists together when the rider grips the top of the bar. The handlebar may be of the "flat" or of the "dropped" variety. The twin-armed bi-furcated arrangement permits the ready mounting of a light, or an instrument, or a map, conveniently in the sight of the rider.

Figure 3:
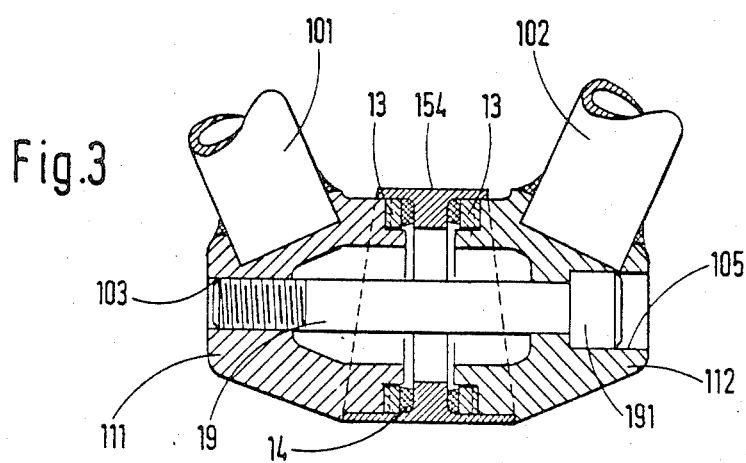
Figure 2:
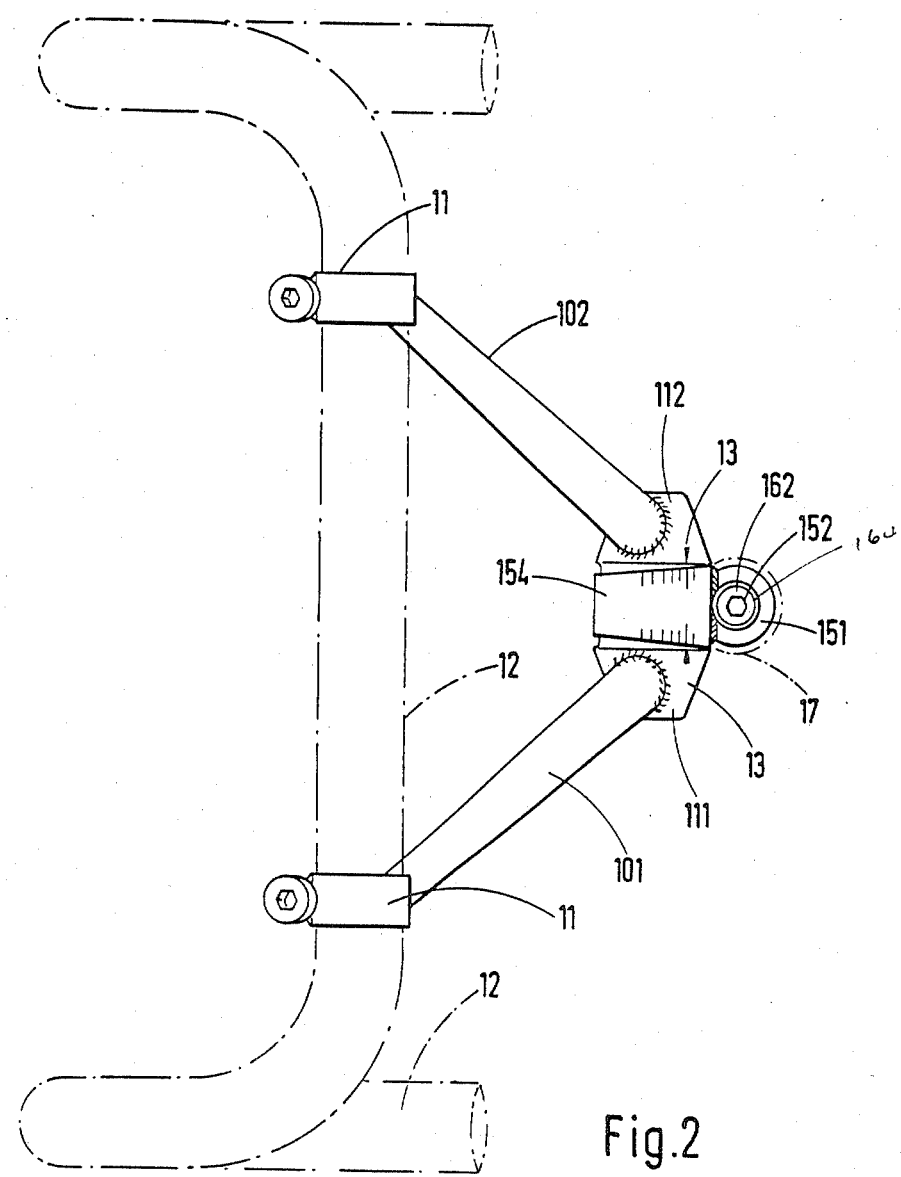
Figure 4:
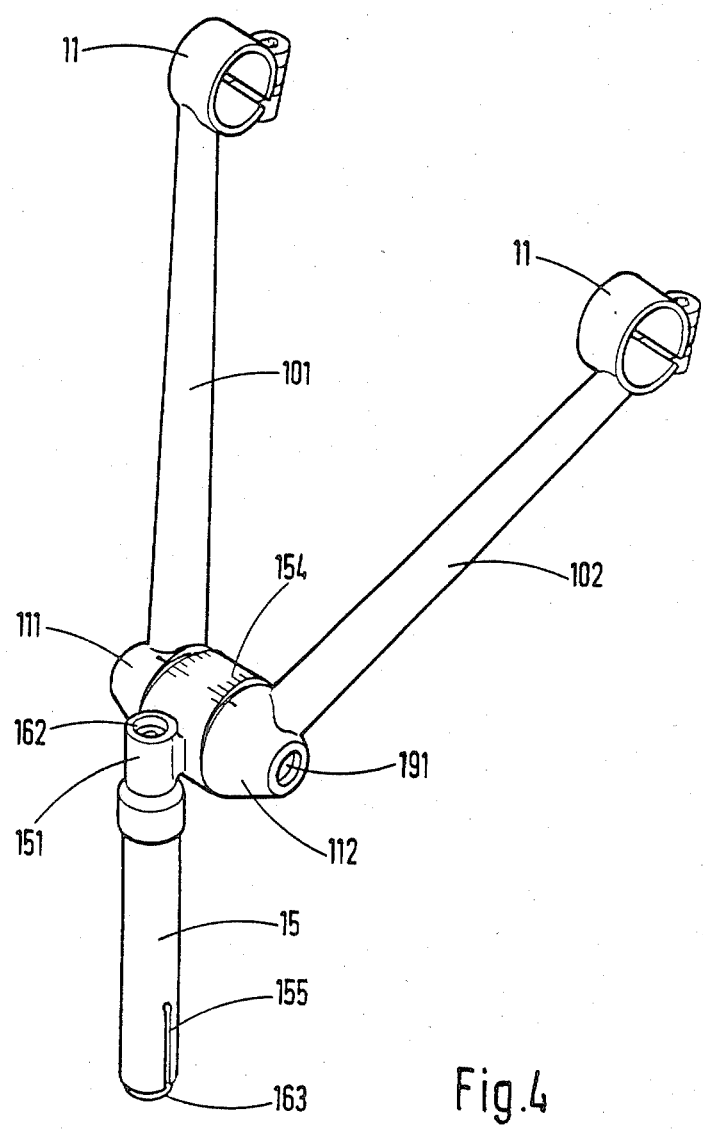

One embodiment of the invention is illustrated by way of example in the accompanying drawings in which:

FIG. 1 is a side view partly in cross-section;
FIG. 2 is a plan view;
FIG. 3 is a plan view of a detail, shown partly in cross-section; and
FIG. 4 is a perspective view.

In the preferred construction shown in FIGS. 1 and 2 of the accompanying drawings, a handlebar, shown in dotted lines at 12, is connected by means including an adjustable stem 15 described below, to a hollow tube constituting a steering column, shown in dotted lines at 17; this steering column 17 being mounted for rotation about its axis in known manner, in a head tube (not shown) forming part of the tubular frame (not shown) of a bicycle.

The handlebar 12 and the steering column 17 are, as so far described, entirely conventional, and this invention is concerned with the provision of means for rigidly but adjustably interconnecting the handlebar 12 with the steering column.

The stem 15 is connected to the steering column 17 so as to be adjustable therein and so that it may be raised or lowered, all in a known manner.

Specifically the stem 15 is fixed within the steering column 17, by means of a conventional expander-bolt device, generally designated 16, so as to be clamped, adjustable for height. As shown in FIG. 1, the expander bolt device 16 will comprise, an elongate bolt 161 which has its head 162 uppermost, this head being rotatable in a socket 152 formed in a cap 151. The cap 151 is fixed at the top of the stem 15 by brazing or welding, and the bolt head 161 is retained in the socket 152 by means for example, of a circlip 164 engaging in a slot formed for that purpose in the wall of the socket 152. At its lower end the bolt 161 has a threaded nut 163. This nut has a tapered external surface such that as the bolt 161 is turned the nut 163 is drawn into, or expelled from, the lower end of the stem 15. The walls of the lower end of the stem 15 are slit longitudinally as shown at 155 in FIG. 4, and as the tapered nut 163 moves inwardly, wedge like, it expands the walls of the stem 15 into clamping contact with the bore of the steering column 17; while movement of the tapered nut 163 outwardly of the lower end of the stem 15, reverses the clamping effect so that the stem 15 can then be adjusted up or down, or in rotation, relative to the steering column 17.

The means interconnecting the stem 15 with the steering column 17 are, as so far described, entirely conventional, and this invention is particularly concerned with the provision of means for rigidly but adjustably interconnecting the handlebar 12 by way of the stem 15, with the steering column 17. As is shown in particular in FIG. 4, these means include a bi-furcated pair of arms 101 and 102 pivotally connected to the aforesaid stem 15.

The twin fork arms 101 and 102, which are appropriately tubular and tapered, and which are bi-furcated and diverge from their rear ends, each terminate at their distal forward ends, in a bolt-up encircling clamp 11, the two clamps 11 holding the handle bar 12.

Each fork arm 101 or 102 terminates at its rear end in a respective boss 111 or 112. Each boss 101 or 102 has an inwardly facing serrated ring 13. The cap 151 atop the stem 15, fixed to the stem by brazing or welding, has brazed or welded to its side, an annular flange 154 which, as is shown in FIGS. 2 and 3, tapers in width from its point of fixture to the cap 151. The serrated rings 13 on the bosses of the two arms 101 and 102 engage each with outwardly facing correspondingly serrated rings 14 on the annular flange 154 which is fixed to the stem 15.

The rings 13 and 14 are clamped in inter-engagement by a single bolt 19, having a head 191 recessed in a socket 105 in boss 112, and a stem 192 having a threaded end screwed into a threaded hole 103 in the boss 111. When the bolt 19 is tightened, the bosses 111 and 112 are urged towards one another with the serrated rings 13 and 14 being clampingly interengaged. This gives a good clamping action for location of the arms 101 and 102, which will extend at a selected angle relative to the stem 15. This angle can be adjusted once the bolt 19 has been loosened.

If the serrated rings 13 engage with the correspondingly serrated rings 14 of the annular flange 154, each by means of say 36 or 40 teeth, adjustment by rotation will be afforded, after temporarily unclamping the interengaged rings. This adjustment will be in discrete angular steps, each of 360/36, or 10°, when there are 36 teeth, or 360/40; or 920, when there are 36 teeth. As is shown in FIG. 4, the flange 154 can be marked with gradations, with selected ones of which, a mark on each of the bosses 111 and 112 can be brought into alignment during such adjustment by rotation.

Because the arms 101 and 102 are separate, the handlebars 12 can be slipped into and through the bolt-up encircling clamps 11 for assembly, whereafter the bosses 111 and 112 will be reclamped to the annular flange 154 at the top of the stem 15, with the interengaging serrated rings being clamped together again also.

The twin arms 101 and 102 constitute a forward extension from the stem 15, which extension is adjustable, to move the handlebar 12 downwardly and forwardly, or upwardly and rearwardly, through up to 180°, by rotation about the transverse horizontal axis of the clamping bolt 19.

Once adjusted, secure clamping is achieved by the serrated rings 13 on the bosses interengaging with the serrated rings 14 on the flange 154; whereafter the height of the handlebar 12 may be further adjusted by raising or lowering the stem 15 relative to the steering column 17.

With advantage, bolts with hexagonally recessed heads are used throughout; and appropriately, the same head socket size, of say 8 mm, is to be found on all clamping bolts; that is, on the bolt 19, on the bolts used in the handlebar encircling clamps 11, and on the bolt of the device 16. In this way, one spanner or key (Allen key) can be used for all adjustments of the handlebar assembly to suit the requirements of the rider.

The assembly, being twin-armed, gives good torsional stiffness for resisting the forces exerted by the rider when pedalling strongly. The provision of adjustment of the twin arms up or down relative to the stem 15, by up to 180°, together with the provision for rotation of the handlebar 12 relative to the steering column 17 through 90°, achieved by loosening the expander-bolt 16, enables the encumbrance posed by all handlebar systems, to be greatly reduced, thus achieving better stowage of the complete bicycle. Finally, the system proposed provides a convenient location, between the twin forwardly extending arms, for a light or some other accessory such as a compass or a map holder.

I claim:

1. An assembly for mounting a handlebar on a steering column of a bicycle, said steering column adapted to be mounted for rotation in a head tube of a bicycle, the handlebar mounting assembly including a tubular stem mounted to the steering column for adjustment relative thereto in the direction axially of said column and stem extension means mounting the handlebar a predetermined distance from said stem, said handlebar mounting assembly including, in combination:

(a) said stem extension means comprising twin birfurcated fork arms, each arm provided with an encircling clamp at one end for mounting the handlebar and terminating at its opposite end in a boss, each boss having an inwardly facing ring of serrations;
   (b) annular flange means affixed to said stem, said annular flange means having an axis at a right angle to the axis of said steering column and the stem mounted thereon, said annular flange means further including an outwardly directed ring of serrations at each of its ends;
   (c) said inwardly facing rings of serrations on said bosses of said fork arms being configured to interengage with the outwardly facing rings of serrations on the ends of said annular flange means affixed to said stem;
   (d) socket means in one of said bosses on the inner end of one of said fork arms, bolt means securing the bosses to said flange, said bolt including a head portion at one end thereof and an end threaded portion at the opposite end, the head of said bolt being recessed in said socket means and said end threaded portion extending axially through said flange and threadably attached to a complementary hole in said boss at the inner end of the outer fork arm;
   (e) said serrated rings being clamped into interengagement by rotation of said bolt to secure said fork arms in preselected angular disposition relative to said stem whereby the handlebar may be adjusted through an arc relative to the top of the stem.

2. The assembly of claim 1, wherein the serrated rings of said respective bosses engage with the correspondingly serrated rings of the annular flange, by means of a predetermined number of interengaging teeth, whereby angular adjustment by rotation is afforded, after temporarily unclamping the interengaged rings, in discrete steps each of predetermined angle.

3. The assembly of claim 2, wherein said angle is 10°, the number of teeth being 36.

4. The assembly of claim 2, wherein said angle is 9°, the number of teeth being 40.

* * * * *